United States Patent
Markie

(10) Patent No.: US 6,990,918 B2
(45) Date of Patent: Jan. 31, 2006

(54) RETRACTABLE AIRFOIL VESSEL

(76) Inventor: William J. Markie, 88 Bermuda Rd., Marco Island, FL (US) 34145

( * ) Notice: Subject to any disclaimer, the term of this patent is extended or adjusted under 35 U.S.C. 154(b) by 57 days.

(21) Appl. No.: 10/408,395

(22) Filed: Apr. 5, 2003

(65) Prior Publication Data

US 2004/0237872 A1    Dec. 2, 2004

(51) Int. Cl.
*B63B 1/16* (2006.01)
(52) U.S. Cl. .................................................. 114/273
(58) Field of Classification Search .............. 114/67 A, 114/272, 273
See application file for complete search history.

(56) References Cited

U.S. PATENT DOCUMENTS

| 913,515 | A | | 2/1909 | Lake |
| 2,274,200 | A | | 2/1942 | Hill |
| 2,887,979 | A | | 5/1959 | Bader |
| 3,139,059 | A | * | 6/1964 | Hanford, Jr. ................. 114/273 |
| 3,164,117 | A | | 1/1965 | Lopez |
| 3,648,641 | A | | 3/1972 | Normand, Jr. |
| 3,786,774 | A | | 1/1974 | Gabel |
| 4,237,811 | A | | 12/1980 | Montez |
| 4,284,027 | A | | 8/1981 | Montez |
| 4,736,700 | A | | 4/1988 | Ishimatsu et al. |
| 4,926,778 | A | | 5/1990 | Johnston |
| 4,955,312 | A | * | 9/1990 | Magazzu' ..................... 114/280 |
| 5,111,766 | A | | 5/1992 | Ortemond |
| 5,404,830 | A | | 4/1995 | Ligozio |
| 5,636,585 | A | | 6/1997 | Schulz |
| 5,813,358 | A | * | 9/1998 | Roccotelli .................... 114/272 |
| 6,014,940 | A | * | 1/2000 | Jacobson ...................... 114/271 |
| 6,199,496 | B1 | * | 3/2001 | Burg .......................... 114/67 A |
| 6,230,835 | B1 | * | 5/2001 | Fischer et al. .............. 180/117 |
| D464,310 | S | | 10/2002 | Fuller et al. |
| 6,546,886 | B2 | * | 4/2003 | Burg .......................... 114/67 A |

\* cited by examiner

*Primary Examiner*—Andrew D. Wright
(74) *Attorney, Agent, or Firm*—Robert M. Patino

(57) ABSTRACT

A retractable-airfoil vessel has surface-effect wings (1) that are hinged or otherwise attached extendedly to a vessel (3). The surface-effect wings are extendable to a use mode in proximity to a surface of water (5) at sides (2) of the vessel for surface-effect lift of the vessel at elevated speeds. At low speeds when pleasure cruising or fishing, when stopped for water activities or when adjusting to rough waters and storm conditions, the surface-effect wings can provide wide-area buoyance on water at sides of a center of gravity of the vessel. The best of all worlds, it can be made to ride-out a storm as safely and securely as an anchored buoy and yet have high-speed efficiency, low-speed pleasure cruising and stopping for swimming and marine exploration. Then for docking in vessel slips and for maneuvering in close proximity to docks and harbor structures, the surface-effect wings can be retracted onto the vessel in a non-use mode for non-interference storage and for docked-living shelter.

9 Claims, 4 Drawing Sheets

RETRACTABLE AIRFOIL VESSEL

BACKGROUND OF THE INVENTION

This invention relates to vessels with airfoils and more particularly to a vessel with retractable airfoils that can have both surface-effect lift and airfoil lift to raise the vessel above water for decreasing power relative to speed of propulsion of the vessel and for increasing its smoothness of ride.

Lifting a vessel above water by increasing speed of its propulsion has long been a design objective for overcoming a marine coefficient of increase in power required per length of a water craft with idealized wave-making and wave-breaking proportions of the vessel under five-hundred feet long. Power required per weight of an idealized ship-proportioned displacement hull having a widening front third and a narrowing aft two-thirds of its length at waterline for wave control multiplies approximately four times with decrease of length from five-hundred feet to one-hundred feet long. To compensate for the marine coefficient of impediment from wave-control-shortness, vessel designers have employed variously planing hulls, hydrofoil structures and airfoil wings to lift vessels partially out of, onto a top surface of or above water in which the vessels are propelled.

Hydrofoils have drawbacks related to resistance of water density and air cavitation.

A ground-effect lift in close proximity to a surface is a more efficient lift means than a hydrofoil because it requires less speed and power to achieve the speed for lift of the vessel as a result of a partial entrapment of and pressurization of air between a bottom surface of a ground-effect wing and a surface that is entrapment-effectively close to the bottom surface of the ground-effect wing. Ground effect over water is achieved from riding on air that is entrapment-effectively pressured against a closely proximate surface of water.

There is no known vessel having an extendable ground-effect wing with a traveling incline that pressurizes air downwardly against a surface of water in a manner taught by this invention.

Examples of most-closely related known but different devices are described in the following patent documents:

| Patent No. | Inventor | Issue Date |
| --- | --- | --- |
| 5,111,766 | Ortemond | May 12, 1992 |
| 4,926,778 | Johnston | May 22, 1990 |
| 4,736,700 | Ishimatsu, et al. | Apr. 12, 1988 |
| 4,284,027 | Montez | Aug. 18, 1981 |
| 4,237,811 | Montez | Dec. 09, 1980 |
| 5,636,585 | Schulz | Jun. 10, 1997 |
| D464,310 | Fuller, et al. | Oct. 15, 2002 |
| 3,648,641 | Normand, Jr. | Mar. 14, 1972 |
| 913,515 | Lake | Feb. 23, 1909 |
| 3,786,774 | Gabel | Jan. 22, 1974 |
| 2,887,979 | J. Bader | May 26, 1959 |
| 3,164,117 | Lopez | Jan. 05, 1965 |
| 2,274,200 | Hill | Feb. 24, 1942 |
| 5,404,830 | Ligozio | Apr. 11, 1995 |
| 6,230,835 | Fischer, et al. | May 15, 2001 |

SUMMARY OF THE INVENTION

Objects of patentable novelty and utility taught by this invention are to provide a retractable-airfoil vessel which:

provides surface-effect lift of a vessel with a surface-effect wing extended to a use mode in proximity to a surface of water;

decreases cost of marine propulsion with less increase in power required for vessel shortness;

provides smoothly cushioned and stable ride at high speeds over water;

provides low-speed stability with wide buoyance in waters that are too rough for surface-effect lift at high speeds;

does not interfere with desired vessel structure and deck activities; and can be retracted to a non-use storage mode for docking in vessel slips or in close proximity to docks and harbors.

This invention accomplishes these and other objectives with a retractable-airfoil vessel having surface-effect wings that are hinged or otherwise attached extendedly to a vessel. The surface-effect wings are extendable to a use mode in proximity to a surface of water at sides of the vessel for surface-effect lift of the vessel at elevated speeds. At low speeds when pleasure cruising or fishing, when stopped for water activities or when adjusting to rough waters and storm conditions, the surface-effect wings provide wide-area buoyance floating on water at sides of a center of gravity of the vessel. The best of all worlds, it can be made to ride-out a storm as safely and securely as an anchored buoy and yet have high-speed efficiency, low-speed pleasure cruising and stopping for swimming, marine exploration and other water-side activities. Then for docking in vessel slips and for maneuvering in close proximity to docks and harbor structures, the surface-effect wings are retractable onto the vessel in a non-use mode for non-interference storage and for docked-living shelter.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

Listed numerically below with reference to the drawings are terms used to describe features of this invention. These terms and numbers assigned to them designate the same features throughout this description.

| | |
|---|---|
| 1. | Surface-effect wings |
| 2. | Sides |
| 3. | Vessel |
| 4. | Bottom surface |
| 5. | Surface of water |
| 6. | Leading edge of a wing |
| 7. | Upwardly contoured leading edges |
| 8. | End walls |
| 9. | Sidewall hinges |
| 10. | Vessel-top extensions |
| 11. | Extension hinges |
| 12. | Top of the vessel |
| 13. | Top surfaces |
| 14. | Top-lift surface |
| 15. | First surface-effect wing |
| 16. | First side |
| 17. | Second surface-effect wing |
| 18. | Second side |
| 19. | End-wall hinge |
| 20. | End-wall controls |
| 21. | Rotational cable |
| 22. | Worm gear |
| 23. | Shock Absorber |

Figure 1:
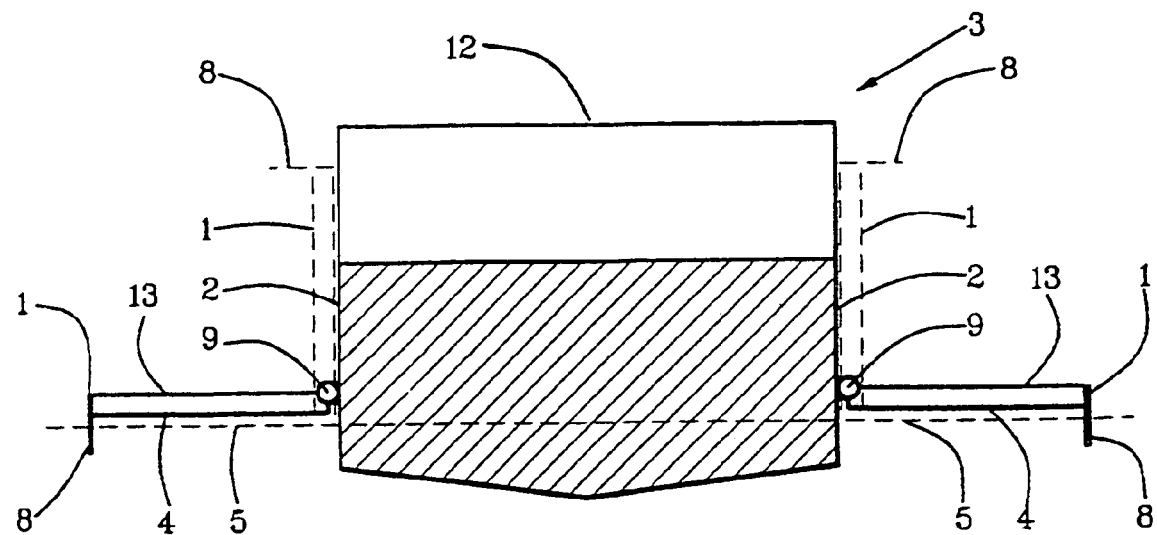
FIG. 1 is a schematic sectional view of the vessel with the surface-effect wings.
Figure 2:
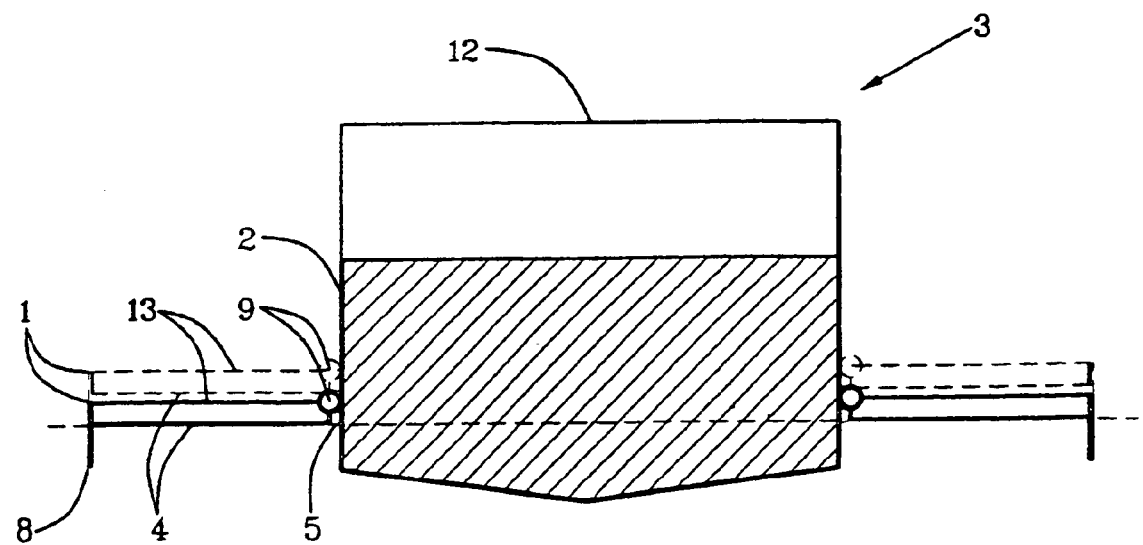
FIG. 2 is the FIG. 1 illustrations with upward and downward positioning attachment of the surface-effect wings to the sides of the vessel.
Figure 3:
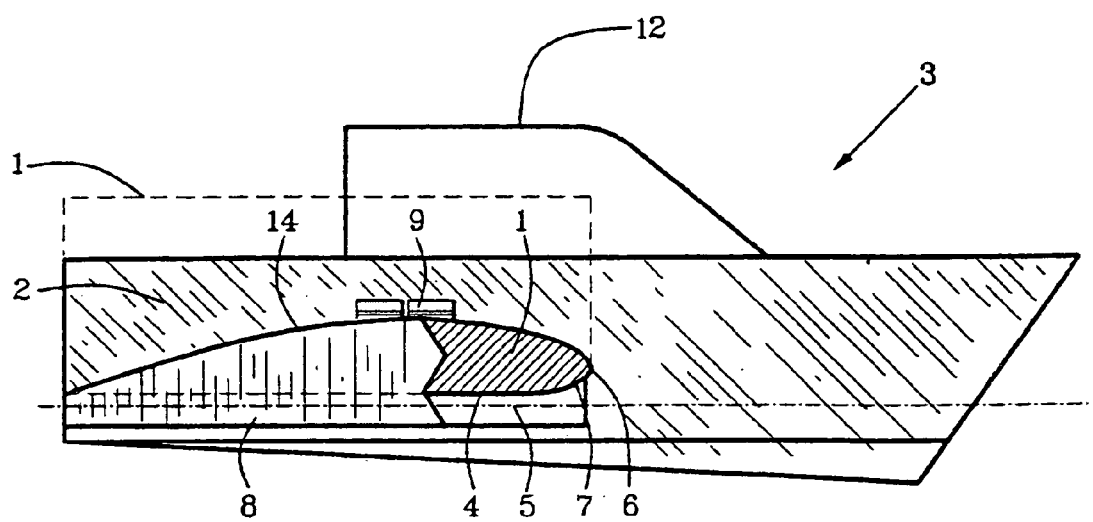
FIG. 3 is a partially cutaway side view of the vessel with the surface-effect wings having top-lift contour.

Referring to FIGS. 1–2, surface-effect wings 1 are attached extendedly to sides 2 of a vessel 3 having power-vessel structure and motorized power for desired marine use. Motorized power can be inboard, outboard or inboard-outboard with a selection of different shapes and sizes of the vessel 3. A vessel hull shown is intended to represent whatever power-vessel hull is desired.

The surface-effect wings 1 have a bottom surface 4 that can be positioned in a use mode proximate, which can be on or above, a surface of water 5 in which the vessel 3 is buoyant. The surface-effect wings 1 are retractable to a storage mode on the vessel 3.

The surface-effect wings 1 include leading edges 6 that extend upward predeterminedly for directing air and water under the surface-effect wings 1 with the vessel 3 traveling forwardly. The surface-effect wings 1 can include leading edges 6 having upwardly contoured leading edges 7 for directing air and water under the surface-effect wings 1 with the vessel 3 traveling forwardly.

The surface-effect wings 1 can include at least a first surface-effect wing 15 that is hinged to a first side 16 of the vessel 3 and a second surface-effect wing 17 that is hinged to a second 18 side of the vessel 3.

The surface-effect wings 1 preferably include end walls 8 that are projected downwardly proximate outside ends of the surface-effect wings 1 for preventing lateral escape of air entrapped under the surface-effect wings 1 during forward travel of the vessel 3.

The surface-effect wings 1 can include sidewall hinges 9 with which the surface-effect wings 1 can be hinged to sides 2 of the vessel 3 for being pivoted downwardly and upwardly intermediate vertical side-storage orientations shown in dashed lines and horizontally extended orientations on the sides 2 of the vessel 3. The sidewall hinges 9 can include adjustable edge attachments with which the surface-effect wings 1 are adjustable upwardly and downwardly in a horizontally extended orientation as depicted in FIG. 2 for being positioned selectively upward and downward for adjustment of distance intermediate bottom surfaces 4 of the surface-effect wings 1 and the surface of water 5.

The sidewall hinges 9 can include adjustable edge attachments with which the surface-effect wings 1 are adjustable upwardly and downwardly in a horizontally extended orientation for being positioned selectively upward and downward.

Preferably, the surface-effect wings 1 are buoyant for providing lateral buoyance to the vessel 3 with the surface-effect wings 1, 15 and 17 resting on the water for stability like a buoy with weight of the vessel 3 being a center ballast of a buoy.

Figure 4:
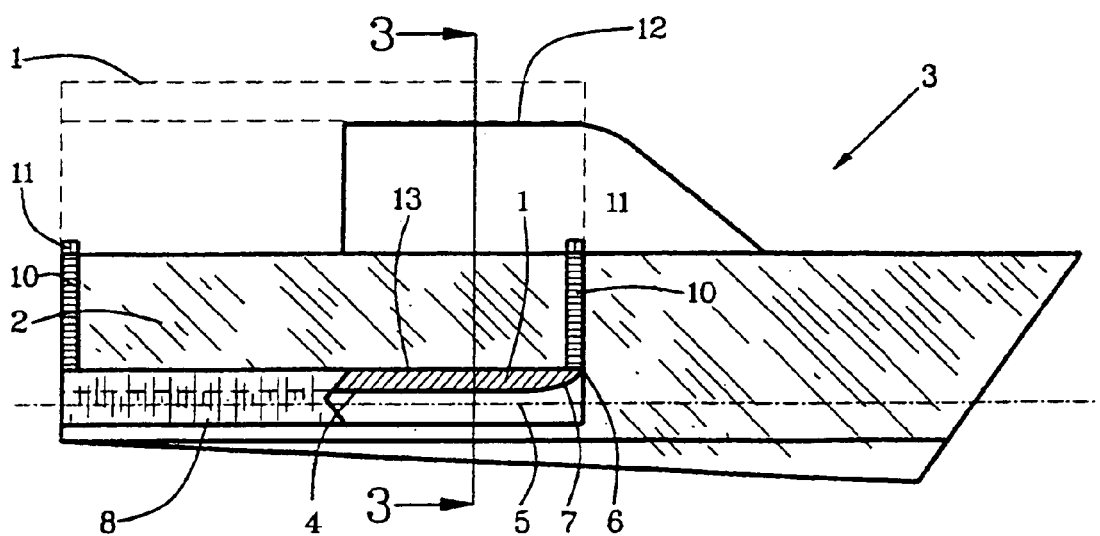
FIG. 4 is a partially cutaway side view of the vessel with the surface-effect wings having vessel-top extensions.

Referring to FIG. 4, the surface-effect wings 1 can include vessel-top extensions 10 with extension hinges 11 on predeterminedly high portions of the vessel 3 for pivoting the surface-effect wings 1 intermediate a vessel-top-storage mode on top of the vessel 12 and an extended mode proximate the surface of the water 5 on which the vessel 3 is buoyant.

The surface-effect wings 1 can have top surfaces 13 that are adapted with buoyance and material construction for supporting one or more people standing, running, lying and sitting for water-sport activities.

The surface-effect wings 1 can include top-lift surfaces 14 that are adapted with top-wing aerodynamic lift for supporting lift of the vessel and for increasing buoyance. Adaptations of the sidewall hinges 9 can be positioned on a top portion of the top-lift surfaces 14 for positioning the top-lift surfaces 14 against the sides 2 of the vessel 3 in a storage mode and for positioning the bottom surface 4 in desired proximity to or on the surface of the water 5.

A wide selection of structural components that include struts, straps, lift motors, hinges, fasteners, lifters and position-supporting means can be employed as needed for positioning the surface-effect wings 1, 15 and 17 reliably and stably in the use mode and in the storage mode.

Figure 5:
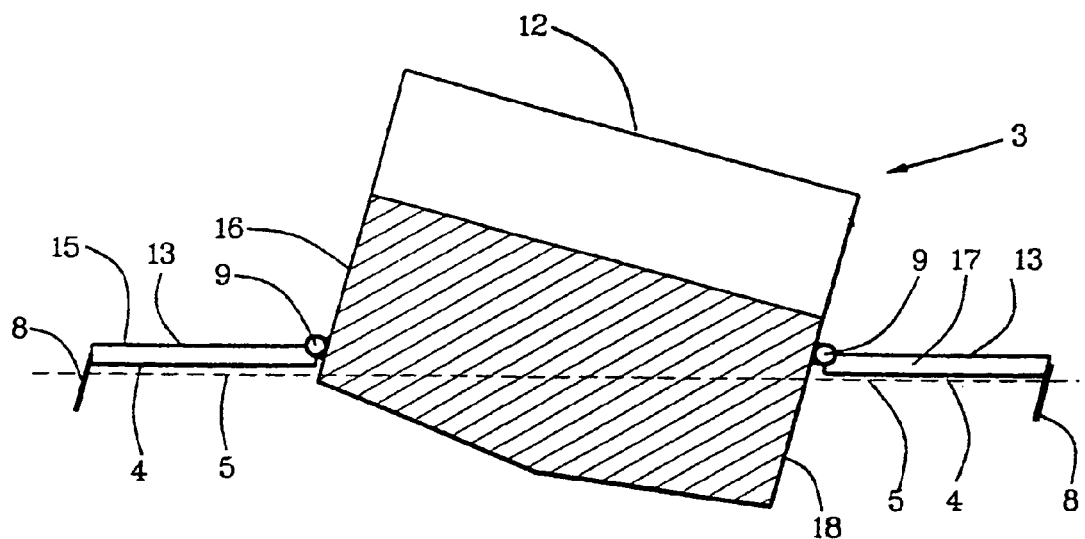
FIG. 5 is a rear view of the vessel turning towards a second side with the first surface-effect wing lowered and the second surface-effect wing raised proportionately.
Figure 6:
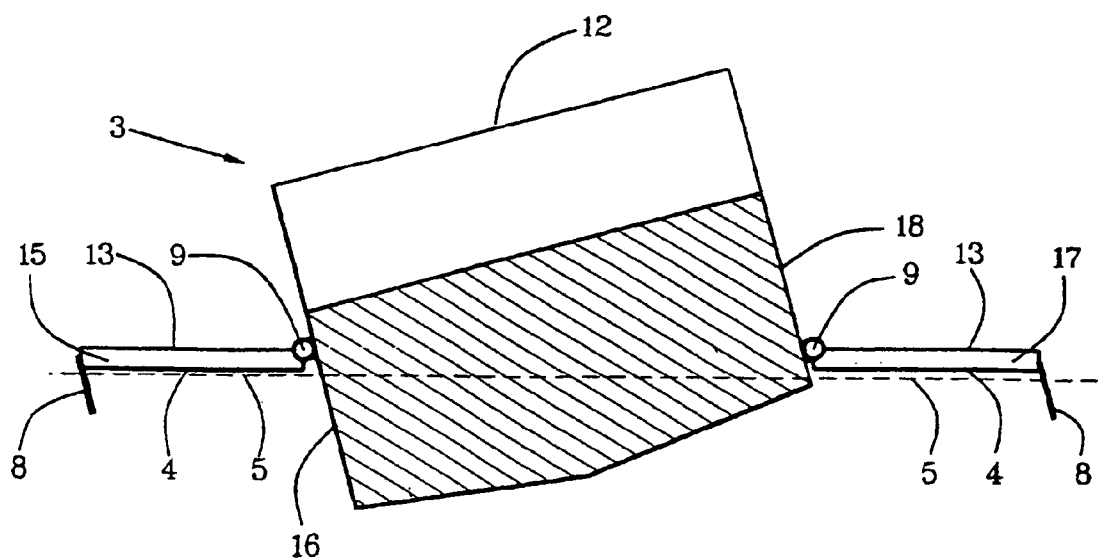
FIG. 6 is a rear view of the vessel turning towards a first side with the surface-effect wing lawered proportionately.
Figure 7:
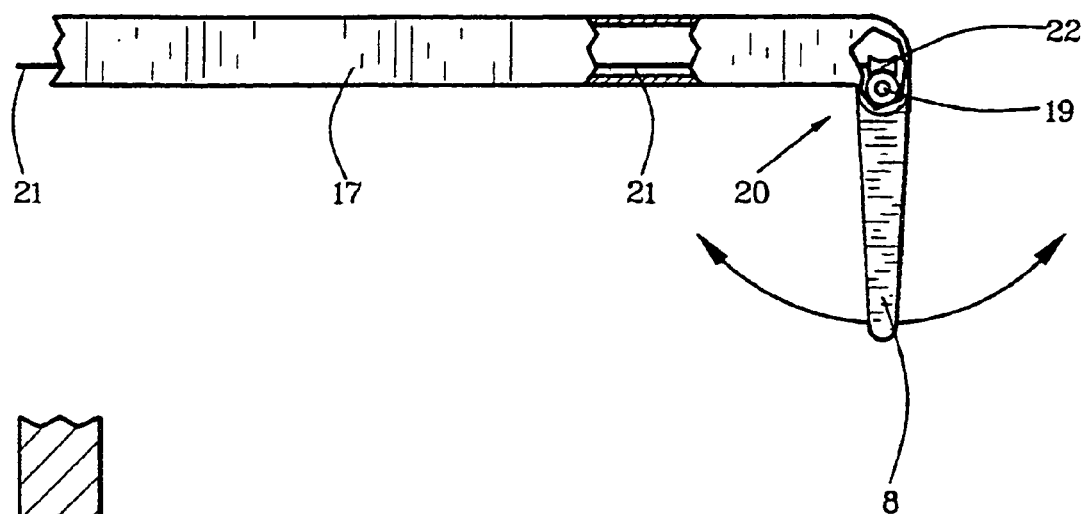
FIG. 7 is a partially cutaway front view of the second suitce-effect wing with the end wall in the vertical orientation.
Figure 8:
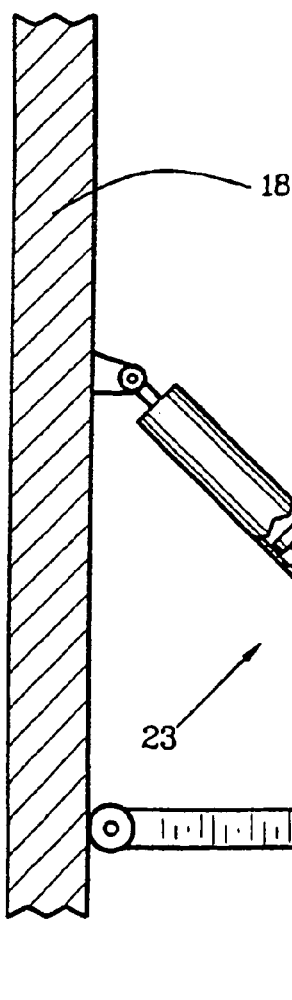
FIG. 8 is a partially cutaway front view of the second surface-effect wing with the end wall supported by a shock-absorbent strut.

Referring to FIGS. 5–6, the surface-effect wings 1 can include at least a first surface-effect wing 15 that is hinged to a first side 16 of the vessel 3 and a second surface-effect wing 17 that is hinged to a second side 18 of the vessel 3. The first surface-effect wing 15 can be pivotal to angles of extension from the first side 16 of the vessel 3 independently and selectively. The second surface-effect wing 17 can be pivotal to angles of extension from the second side 18 of the vessel 3 independently and selectively. This provides turn banking in the water 5.

The first surface-effect wing 15 can be moveable upwardly and downwardly on the first side 16 and the second surface-effect wing 17 can be moveable upwardly and downwardly on the second side 18 independently and selectively.

Referring to FIGS. 5–8, the end walls 8 can include end-wall hinges 19 with which the end walls 8 are pivotal to select downward orientations. The end-wall hinges 19 can include end-wall controls 20 with which downward orientations of the end walls 8 are controllable remotely with control systems that can include rotational cables 21 and worm gears 22.

The surface-effect wings 1, 15 and 17 can include shock-absorbers 23 for shock-absorbent attachment to the vessel 3 to prevent communication of shock to the vessel 3 from abrupt impact of the surface-effect wings 1, 15 and 17 with water. The sidewall hinges 9 can be attached to the shock absorbers 23 for shock-absorbent attachment of the surface-effect wings 1, 15 and 17 to the vessel 3.

A new and useful retractable-airfoil vessel having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A retractable-airfoil vessel comprising:

surface-effect wings attached extendedly to sides of a vessel having structure and motorized power for desired marine use;

the surface-effect wings each including a bottom surface adapted for riding on air flowing intermediate the bottom surfaces of the surface-effect wings and a surface of water in which the vessel is buoyant and the vessel is traveling forwardly at a speed for causing the air to flow intermediate the bottom surface of the surface-effect wings and the water for achieving surface-effect lift with the surface-effect wings;

the surface-effect wings include sidewall hinges with which the surface-effect wings can be hinged to sides of the vessel for being pivoted downwardly and upwardly intermediate vertical side-storage orientations and horizontally extended orientations on the sides of the vessel predeterminedly; and the sidewall hinges include adjustable edge attachments with which the surface-effect wings are adjustable upwardly and downwardly in a horizontally extended orientation for being positioned selectively upward and downward for adjustment of distance intermediate bottom surfaces of the surface-effect wings and a surface of water.

2. The retractable-airfoil vessel of claim 1 wherein:

a first surface-effect wing is pivotal on a first sidewall hinge to angles of extension from the first side of the vessel independently and selectively; and a second surface-effect wing is pivotal on a second sidewall hinge to angles of extension from the second side of the vessel independently and selectively.

3. The retractable-airfoil vessel of claim 2 wherein:

the first sidewall hinge is moveable upwardly while the second sidewall hinge is moveable downwardly for turning the vessel in a direction of the first sidewall hinge; and the second sidewall hinge is moveable upwardly while the second sidewall hinge is moveable downwardly for turning the vessel in a direction of the second sidewall hinge.

4. The retractable-airfoil vessel of claim 1 wherein:

the surface-effect wings include top surfaces that are adapted with buoyance and material construction for supporting one or more people for engagement in waterside activities on the top surfaces.

5. The retractable-airfoil vessel of claim 1 wherein:

the surface-effect wings include top-lift surfaces that are adapted with top-wing aerodynamic lift for supporting lift of the vessel and for increasing buoyance.

6. The retractable-airfoil vessel of claim 1 wherein:

the surface-effect wings include shock-absorbers for shock absorbent attachment to the vessel and thereby to prevent communication of shock from abrupt impact of the surface-effect wings with water.

7. The retractable-airfoil vessel of claim 1 wherein:

the surface-effect wings are buoyant for providing lateral buoyance to the vessel for stability.

8. The retractable-airfoil vessel of claim 1 wherein:

the surface-effect wings include vessel-top extensions with extension hinges on predeterminedly high portions of the vessel for pivoting the surface-effect wings intermediate a vessel-top-storage mode on top of the vessel and an extended mode proximate the surface of the water on which the vessel is buoyant.

9. The retractable-airfoil vessel of claim 1 wherein:

the surface-effect wings being retractable to a storage mode on the vessel.

* * * * *